Figure 1:
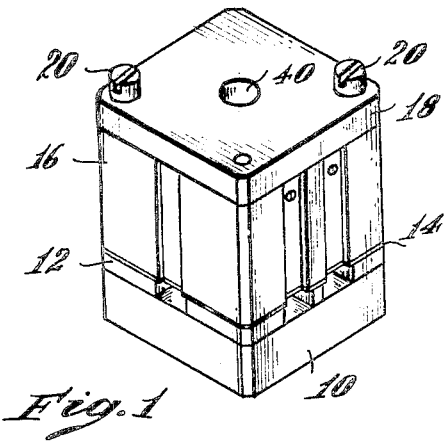

INVENTOR.
Barron C. Watson
BY
Roberts, Cushman & Grover
ATT'YS

United States Patent Office 3,389,606
Patented June 25, 1968

3,389,606
TIME RESOLVING MECHANICAL
ACCELEROMETER
Barron C. Watson, Cambridge, Mass., assignor, by mesne assignments, to the United States of America as represented by the United States Atomic Energy Commission
Filed Jan. 29, 1965, Ser. No. 428,998
11 Claims. (Cl. 73—492)

This invention relates to accelerometers and, in particular, to mechanical accelerometers designed for industrial and military uses to obtain data from a single-pulse input which will enable predicting failure or assessing the resistance to failure of applications such as the response of vehicles and structures to nuclear weapon or chemical high explosive detonations; measurement of ground or water-borne shock waves; monitoring of aircraft components subject to failure from hard landing (that is, landing gear); and monitoring of handling loads in shipping, and so forth.

The accelerometer herein illustrated is adapted to measure acceleration, the intensity of which may be from a few times to many thousands of times the acceleration of gravity and where the duration of the pulse is less than about 0.01 second, and comprises a plurality of weights of different mass releasably supported at predetermined different distances from anvils, comprised of malleable metal, for release when a predetermined threshold acceleration is exceeded to make a series of permanent depressions in the malleable metal from which acceleration time history can be determined.

The principal objects of this invention are to provide an accelerometer of the foregoing kind with means for disabling it following actuation in response to a single-pulse of a magnitude exceeding that for which it was preset so that it will not record subsequent pulses; to provide means, for disabling the instrument, which is moved to operative position by movement of the weights as they travel to their positions of contact with their respective anvils; to provide means which will offer no appreciable resistance to movement of the weights in the direction of the anvils but stiffly resist movement in the opposite direction; to provide means which has no appreciable inertia; to provide means which may be easily restored to operativeness if not damaged in use or if damaged may be easily replaced; and to provide means which is easily incorporated in the instrument, inexpensive and simple to manufacture.

As herein illustrated, the invention comprises, in combination with a plurality of weights of different mass and means releasably supporting the weights at different distances from a corresponding number of anvils; means situated in the path of movement of each weight toward its anvil, movable into a position in response to movement of the weight into engagement with the anvil to prevent retreat of the weight from the anvil. The means employed are cantilever-supported latch members which project into the path of each weight, are supported against deflection in a direction away from the anvil and are unsupported in the direction of the anvil. There may be one or more such levers projecting into the path of each weight and the weights have in their peripheral surfaces peripheral grooves spaced axially within which the ends of the latch members engage when the weights move into engagement with the anvils.

Figure 2:
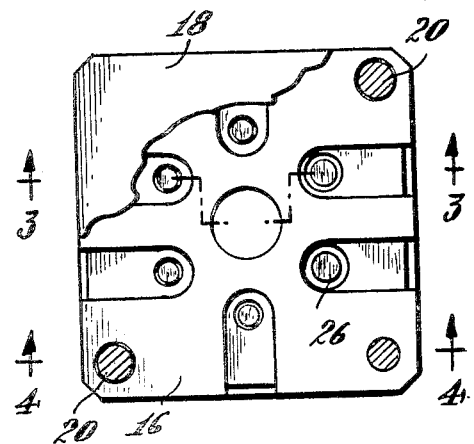
Figure 3:
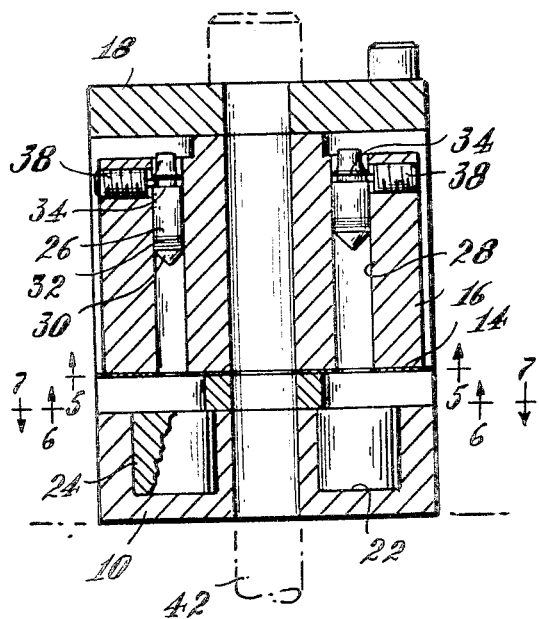
Figure 4:
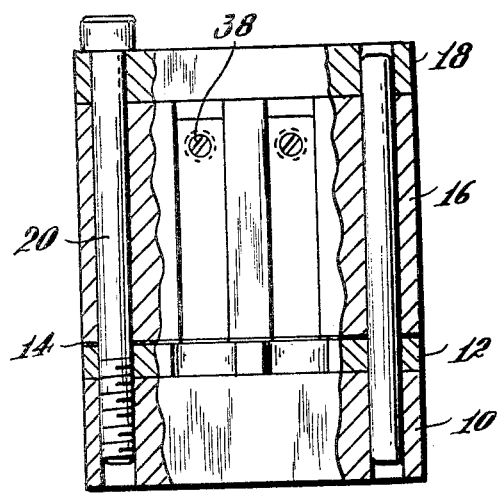
Figure 5:
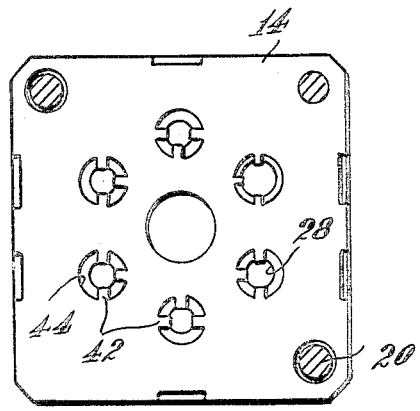
Figure 6:
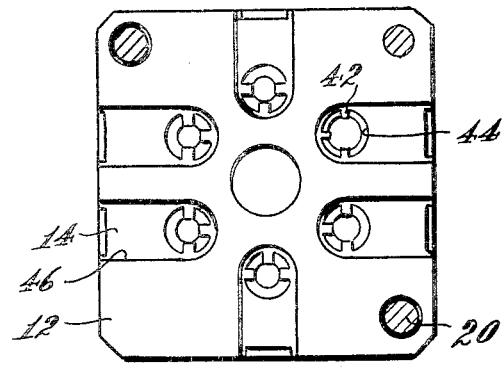
Figure 7:
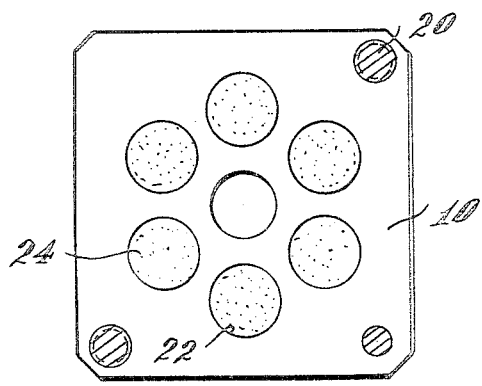
Figure 8:
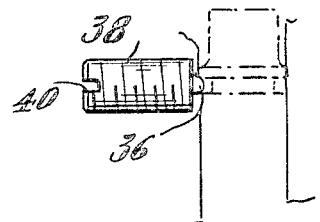
Figure 8:
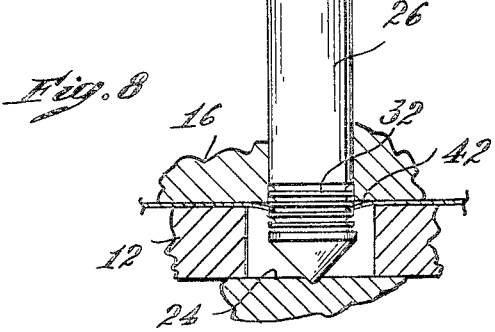

The invention will now be described in greater detail with reference to the accompanying drawings wherein:

FIG. 1 is a perspective view of the accelerometer;
FIG. 2 is a top view of FIG. 1 with the top broken away in part;
FIG. 3 is a vertical section taken on the line 3—3 of FIG. 2;
FIG. 4 is a vertical section taken on the line 4—4 of FIG. 2;
FIG. 5 is a horizontal section taken on the line 5—5 of FIG. 3;
FIG. 6 is a horizontal section taken on the line 6—6 of FIG. 3;
FIG. 7 is a horizontal section taken on the line 7—7 of FIG. 3; and
FIG. 8 is an enlarged fragmentary section showing a single weight in suspended and latched positions.

The accelerometer as shown in FIG. 1 is substantially cubical in shape comprising a base 10, a spacer plate 12, a latch plate 14, a support 16 and a cap 18 superposed one upon another and secured together by diagonally disposed bolts 20 which extend through holes in the several parts.

The base 10 (FIG. 7) is comprised of a rigid metal, for example brass, and has in one surface a plurality of drilled holes 22 arranged in a circle around its center in each of which is a body 24 of soft malleable metal deformable by impact. Each body of metal constitutes an anvil capable of retaining the detent made therein indefinitely.

The support 14 (FIG. 3) holds a plurality of weights 26 of different mass at different distances above the base 10 for release when a predetermined threshold acceleration is exceeded and guides the weights along paths perpendicular to the surfaces of the anvils. The support contains for this purpose a plurality of vertically disposed passages 28 corresponding in number to the anvils, arranged arounnd the center of the support with their axes perpendicular to and passing through the center of the anvils. The weights 26 correspond substantially in diameter to the passages so as to have free non-binding sliding engagement therewith have conically pointed lower ends 30, contain a plurality of axially spaced peripheral grooves 32 adjacent their conical ends and a single peripheral groove 34 adjacent their upper ends. The weights are held suspended in the passages 28 by spring-pressed balls 36 supported in threaded bushings 38 screwed into the support in positions such that the balls project into the passages and into engagement with the grooves at the upper ends of the weights (FIG. 8). By adjustment of the threaded bushings the pressure between the balls and the grooves in the weights may be increased or decreased to enable adjusting the degree of acceleration which will effect release of the weights.

In accordance with this invention, means is provided in the form of latches operable to hold the weights engaged with the anvils following the first impact of the weights with the anvils to prevent retreat of the weights from the anvils and the possibility of additional impacts which would give a false measurement. The aforesaid means comprises cantilever-supported latches 42 which project into holes 44 formed in the latch plate 14. The holes 44 are concentric with the lower ends of the passages 28 but are of larger diameter (FIG. 5) so that the major portions of the upper sides of the latches 42 have contact with the lower end of the support. Only the inner ends of the latches extend into the path of movement of the weights.

The latch plate 14 is held engaged with the underside of the support 14 by the spacer plate 12 which has in it a plurality of notches 46 which extend inwardly from the edges of the plate and which at their inner ends are concentric with the holes in the latch plate (FIG. 6). The inner ends of the openings in the spacer plate are slightly larger than the holes in the latch plate hence the cantilever-supported latches 42 are unsupported at their underside and hence free to flex in a direction toward the anvil.

The latch plate 12 is comprised of thin sheet metal in the order of .001 inch thick and the latch members 42 are in the order of 1/16 inch in length. There are three latch members projecting into each hole and only about 1/4 of the length of each latch projects into the path of the weight with which it is associated. As pointed out above, the upper side of each latch, except for the tip, is engaged with the lower end of the support 16 and the lower side is unsupported so that it flexes freely in the direction of movement of the weight toward the anvil, but resists retreat of the weight from the anvil.

In order to obtain the least amount of restraint to movement of the weights toward the anvil and the maximum amount of restraint to retreat, the grooves 32 at the lower ends of the weights (FIG. 8) are cut with a bevel on the forward side, that is, the side in the direction of movement of the weights toward the anvil and with flats at the rear sides.

The entire assembly contains a hole 40 through it in which may be placed a bolt 42 for mounting the accelerometer in position for use.

The accelerometer is made ready for use by adjusting the spring-pressed balls to fix the threshold acceleration beyond which the accelerometer will function. This is accomplished by screwing the bushings 38 in or out which, for this purpose, are provided with slots 40 for receiving the end of a screw driver. In use as soon as the accelerometer exceeds the threshold limit determined by the holding devices, the weights become truly seismic and move through their different predetermined distances sequentially into engagement with the individual soft metal anvils where they are held by the latches referred to above. By preventing retreat of the weights so that they might not obtain further significant relative velocity error is avoided.

The latches are formed in the sheet metal by simple die-cutting operations or photoetching and are effective withoutn interfering with the accuracy of the accelerometer because of their extreme flexibility and substantial absence of inertia. The latch plate may be used repeatedly until damaged and when damaged can be quickly and easily replaced.

It has been demonstrated that the volume of the indent made by any weight in the aforesaid instrument is directly proportional to the kinetic energy of the weight at impact and hence, in practice, the indent diameter can be related to the velocity of the weight at impact. In the order of increase weight to anvil spacing, the weights sequentially integrate over an increasing proportion of the acceleration pulse and, therefore, attain increase in final velocity. By calibration the anvil indents can be translated into these final velocities and hence an acceleration time history may be developed. Although the accelerometer as herein shown has fixed weights, different numbers of weights may be employed without departing from the spirit of the invention.

It should be understood that the present disclosure is for the purpose of illustration only and that this invention includes all modifications and equivalents which fall within the scope of the appended claims.

I claim:

1. An accelerometer comprising an anvil, a weight adapted to make a permanent impression on the surface of the anvil by impact therewith, and means supporting the weight at a predetermined distance from the anvil, said means being adapted to release the weight when a predetermined threshold acceleration is exceeded; characterized in that there is means situated in the path of movement of the weight toward the anvil, movable into a position in response to movement of the weight to a position in contact with the anvil to trap the weight at the place of impact of the anvil to prevent reactivation of the weight.

2. An accelerometer comprising an anvil, a weight adapted to make a permanent impression on the surface of the anvil by impact therewith, and means supporting the weight at a predetermined distance from the anvil, said means being adapted to release the weight when a predetermined threshold acceleration is reached; characterized in that there is means situated in the path of movement of the weight deflectable in the direction of movement of the weight by movement of the weight into engagement with the anvil operative, by engagement with the weight, to prevent retreat of the weight from the anvil following engagement of the weight with the anvil.

3. An accelerometer comprising an anvil, a weight adapted to make a permanent impression on the surface of the anvil by impact therewith, and means supporting the weight at a predetermined distance from the anvil, said means being adapted to release the weight when a predetermined threshold acceleration is exceeded; characterized in that there is means supported in the path along which the weight moves yieldable to movement of the weight in a direction toward the anvil to permit unconstrained passage of the weight in that direction and opposed to retreat of the weight following impact with the anvil.

4. An accelerometer comprising an anvil, a support opposite the anvil, said support containing a guide perpendicular to the anvil, a weight slidably engaged with the guide, means on the support cooperable with the weight to hold the latter in the guide spaced from the anvil, said last-named means being adapted to release the weight when a predetermined threshold acceleration is exceeded; characterized in that a cantilever-supported latch is supported with an end in the path of movement of the weight along the guide, said latch being unsupported and freely deflectable in the direction of movement of the weight, and means supporting the latch against deflection in the direction of retreat of the weight.

5. An accelerometer comprising an anvil, a support opposite the anvil, a guide passage on the support perpendicular to the anvil, a weight engaged with the guide for movement toward the anvil, a cantilever-supported part extending into the guide passage between the end of the weight and the anvil, means at the side of the part adjacent the weight supporting the part except for its extremity, said part being unsupported throughout its length at the side adjacent the anvil and deflectable by movement of the weight into engagement with the anvil, and means on the weight interengageable with the deflected end of said part operable to prevent retreat of the weight.

6. An accelerometer comprising an anvil, a support opposite the anvil containing a guide perpendicular to the anvil, a latch plate situated between the support and the anvil in engagement with the support, said latch plate containing an opening therein concentric with the passage in the support and of larger area into which projects cantilever-supported latches, each of which is constrained for its tip, which project into the passage by the support marginally of the passage, a spacer situated between the latch plate and the anvil, said spacer containing an opening corresponding in size to the opening in the latch plate and supporting the latch plate except for the cantilever-supported latches in engagement with the support, said latches being deflectable in the direction of their unsupported sides and resistant to deflection in the direction of their supported sides, means on the weights engageable with the deflected ends of the latches operable to prevent retreat of the weights, and means securing the anvil, spacer, latch plate and support to each other.

7. An accelerometer comprising an anvil, a support opposite the anvil containing a plurality of guide passages around a common center perpendicular to the anvil, a weight disposed in each passage, each weight having a plurality of peripheral grooves spaced axially thereof, means releasably supporting the weight in each passage, a latch plate and spacer plate mounted between the support and anvil with the latch plate next to the support and the spacer next to the anvil, said latch plate containing a plurality of holes corresponding in number to the guide passages concentric with said passages and of larger diameter, a plurality of cantilever-supported latch members extending into the holes in the plate with their ends projecting into the passages at right angles to the axes of said passages for engagement with said grooves, said cantilever-supported latch members being supported except for their tips at the sides adjacent the weights by engagement of the major portions of their lengths with the support, and said spacer having contact with the side of the latch plate next to the anvil and supporting the latter except for the cantilever-supported latch members, and means securing the several parts to each other.

8. An accelerometer according to claim 7, characterized in that the latch plate is comprised of sheet metal having a thickness in the order of 0.001.

9. An accelerometer according to claim 7, characterized in that the cantilever-supported latch members are approximately $\frac{1}{16}$ inch long and have supported and unsupported portions in the order of $\frac{3}{64}$ and $\frac{1}{64}$ respectively.

10. An accelerometer comprising a base plate containing a plurality of soft metal anvils arranged about a common center, a support mounted on the base plate, said support containing a plurality of holes perpendicular to the base plate and concentric with the anvils, weights in the holes in the support, yieldable means supporting the weights in suspension in said holes, a spacer plate situated between the base plate and support holding the lower ends of the holes in the supports spaced from the base plate, said spacer plate containing openings aligned with the holes in the support and base plate through which the weights are free to move from the support into engagement with the anvils in the base plate, a latch plate situated between the support and the spacer plate containing holes concentric with the holes in the support but of larger diameter, and cantilever-supported members extending into the holes in the latch plate so that only the inner ends of the latches overlap the holes in the support, the holes in the spacer corresponding in size to the holes in the latch plate so that the cantilever-supported members are unsupported at the side next to the spacer plate and are freely deflectable into the openings in the spacer plate by movement of the weights through the latch plate and spacer plate into contact with the anvil in the base, said weights having pointed ends and containing near their pointed ends axially spaced grooves with which the inner projecting ends of the cantilever-supported members are engaged by movement of the weight into contact with the anvils in the base and which resist disengagement of the weights from the base following engagement therewith.

11. An accelerometer according to claim 10, wherein the yieldable means is adjustable to release the weights at a predetermined threshold acceleration.

References Cited

UNITED STATES PATENTS

| | | | |
|---|---|---|---|
| 2,454,793 | 11/1948 | Grogan et al. | 73—492 XR |
| 2,583,004 | 1/1952 | McCorkle | 73—35 |
| 3,109,309 | 11/1963 | Luttrell | 73—492 |
| 3,267,739 | 8/1966 | Epps et al. | 73—492 |

JAMES J. GILL, *Primary Examiner.*